United States Patent [19]
Mauldin et al.

[11] Patent Number: 5,749,133
[45] Date of Patent: May 12, 1998

[54] METHOD AND APPARATUS FOR FORMING STRINGS OF POCKETED SPRINGS

[75] Inventors: Michael W. Mauldin, Hiram; Bernhard W. Kuchel, Stone Mountain, both of Ga.

[73] Assignee: Simmons Company, Atlanta, Ga.

[21] Appl. No.: 711,484

[22] Filed: Sep. 10, 1996

[51] Int. Cl.[6] .................................................. B68G 7/00
[52] U.S. Cl. ........................... 29/91.1; 29/430; 29/451; 29/779; 53/114
[58] Field of Search ................. 5/716, 720; 53/524, 53/114; 29/430, 451, 91, 91.1, 771, 779, 791, 795, 797, 819, 227

[56] References Cited

U.S. PATENT DOCUMENTS

| | | | |
|---|---|---|---|
| 1,566,068 | 12/1925 | Brundage | 53/114 |
| 1,861,429 | 5/1932 | Schneider et al. | 53/114 |
| 1,915,264 | 6/1933 | Schneider et al. | 53/114 |
| 1,950,186 | 3/1934 | Lofman | 53/114 |
| 2,093,531 | 9/1937 | Werner | |
| 2,113,457 | 4/1938 | Zeier | 53/114 |
| 2,647,671 | 8/1953 | McInerney | 53/114 |
| 2,663,475 | 12/1953 | McInerney et al. | 53/114 |
| 2,983,236 | 5/1961 | Thompson | 53/114 |
| 3,668,816 | 6/1972 | Thompson | 53/114 |
| 4,234,983 | 11/1980 | Stumpf | |
| 4,439,977 | 4/1984 | Stumpf | |
| 4,986,518 | 1/1991 | Stumpf | |

Primary Examiner—David P. Bryant
Attorney, Agent, or Firm—Jones, Day, Reavis & Pogue

[57] ABSTRACT

Methods and apparatus are provided for forming strings of springs enclosed within pockets having flat overlapping side seams avoiding problems with false loft in mattress construction.

23 Claims, 7 Drawing Sheets

METHOD AND APPARATUS FOR FORMING STRINGS OF POCKETED SPRINGS

CROSS-REFERENCE TO RELATED APPLICATIONS

This is an improvement patent application over commonly owned, U.S. Pat. No. 5,613,287, to Albert R. St.Clair, filed Jun. 7, 1995, entitled: "Method and Apparatus for Forming Strings of Pocketed Springs."

BACKGROUND OF THE INVENTION

1. Field of the Invention

The present invention relates to spring assemblies for mattresses, cushions and the like and, more particularly, to new and improved methods and apparatus for forming strings of springs enclosed within pockets having flat overlapping side seams which do not exhibit the disadvantageous condition encountered in prior art assemblies known as false loft.

2. Description of Related Art

Numerous techniques have evolved for constructing mattresses, cushions and the like. One such technique which has gained wide acceptance is known as Marshall construction. In this construction, an innerspring assembly comprises the core of the mattress or cushion and is manufactured from a plurality of springs, each individually encapsulated in a pocket of suitable fabric. The pockets of springs are preferably joined together in a string of predetermined length and are arranged in a closely packed array all with their longitudinal axes parallel one to another and with their ends defining a plane. In mattress construction, this array of pocketed springs is typically covered with a quilted foam and fabric pad thereby providing a sleeping surface.

Strings of pocketed coil springs have been manufactured in different ways. In an early method of manufacture, a suitable fabric was folded in half lengthwise and stitched transversely at regular intervals to define pockets into which springs were inserted. This method has largely been replaced in more recent times by a method which uses heat sensitive fabric and ultrasonic welding techniques instead of stitching. An example of strings of pocketed coil springs manufactured by this latter method is disclosed in U.S. Pat. No. 4,234,983, issued to Stumpf and assigned to the common assignee herein. As disclosed in U.S. Pat. No. 4,234,983, a string of pocketed coils is formed by ultrasonically welding the coils into discrete pockets by first folding a heat sensitive fabric in half lengthwise and applying welds transversely to the longitudinal axis of the fabric. Once the coil springs are inserted into the pockets, the pockets are welded closed along a seam running lengthwise of the coil string adjacent to one end of the springs. Apparatus for manufacturing the foregoing strings of coils is disclosed, for example, in U.S. Pat. No. 4,439,977, also issued to Stumpf and assigned to the common assignee herein.

A disadvantage of strings of coil springs of the foregoing construction is that the seam running lengthwise of the coil string creates two flaps of excess fabric material at one end of the pocketed springs. Some excess material is necessary along the seam to provide for proper alignment of the string in manufacture and assure adequate strength of the associated welds. However, when the string of coils is arranged to define an innerspring mattress or cushion core, the excess material projecting outwardly of the springs creates a false firmness which is known in the art as "false loft", beneath the outer surface pad of the mattress or cushion. This false loft condition can cause undesirable and objectionable body depressions to form when a user lies on a mattress or cushion.

Attempts have been made to eliminate false loft by constructing a string of coil springs having a flat overlap side seam instead of a top seam. A machine for constructing such coil strings is disclosed, for example, in U.S. Pat. No. 4,986,518, also issued to Stumpf and assigned to the common assignee herein. However, such a machine has a complicated elevator mechanism for spring insertion which has proven to be unreliable under manufacturing conditions.

U.S. Pat. No. 5,613,287 novel method and apparatus for forming strings of pocketed springs having flat overlapping side seams which eliminates false loft. In the St. Clair system, a web of heat sensitive fabric passes over a diamond-shaped folding plate and a first fold in the fabric is created defining a first flap. The fabric then passes over a series of rollers whereupon a hook member causes an edge of the fabric to reversely turn over the web and form a second fold. The second fold creates a second flap which overlaps the first flap. The resulting fabric tube next advances to a deflector station at which an arm member deflects the overlapping flap as to form an opening in the tube. A spring inserter then inserts a spring transversely into the open tube. The tube next advances to a second deflector station at which the second flap is deflected to its original overlapping relation with the first flap thus closing the tube with the spring inserted in it. A weld is then formed between the overlapping flaps. Then, transverse welds are formed in the tube between adjacent spring coils thereby defining individual fabric pockets containing the springs.

An early form of apparatus for forming strings of pocketed coil springs is disclosed in Werner, U.S. Pat. No. 2,093,531. The apparatus therein disclosed comprises a coil insertion mechanism wherein an operator manually compresses a spring coil using a handle. Then a preformed tube of fabric having stitched pockets formed in it is brought to the apparatus whereupon the pockets are manually opened and flaps of the tube are separated and placed over two parallel spaced tongues. The compressed spring is inserted into the pocket by depressing a foot pedal and sliding the spring between the tongues whereupon the fabric tube can be extracted from the tongues and the flaps manually realigned to a closed condition.

A disadvantage of the Werner apparatus is that it requires manual operation and is not at all adaptable to a high speed assembly process. Clearly, the fabric tube must be preformed to define pockets. The pockets must be manually opened to insert the coil springs using the Werner tongues. There is no disclosure, teaching or suggestion in Werner of how a string of pocketed coil springs could be formed using a fully automated process starting with a web of unfolded fabric and ending with a completely formed string of pocketed coil springs having flat overlapping side seams as is accomplished by the aforementioned St. Clair process.

While the St. Clair process and apparatus are markedly advantageous over the prior art for use in high speed pocketed coil spring production, it is desirable to provide improvements in such a process and apparatus. In particular, it is desirable to reduce the number of steps in the process of automatically folding a web of fabric into a tube, inserting coil springs in the fabric tube, forming flat overlapping side seams in the fabric and forming individual pockets around the springs.

Accordingly, it has been found to be desirable to provide mattress or cushion constructions in which the innerspring assembly is enclosed within pockets having flat overlap side seams. In particular, it has been found to be desirable to provide such mattress or cushion constructions which do not exhibit false loft by virtue of excess pocketing material adjacent the ends of the coils. Furthermore, it has been found to be desirable to provide coil string assemblies for innerspring constructions which use less pocketing fabric material than has been required in previously known constructions.

Still further, it has been found to be desirable to provide apparatus for constructing pocketed coil strings which are housed within pockets having flat overlapping side seams. Such apparatus has been found to be effective, efficient and reliable in use and is structured to be readily retrofitted with existing prior art equipment at an economical cost.

SUMMARY OF THE INVENTION

The present invention is an improvement over the invention disclosed in U.S. Pat. No. 5,613,287 by providing a method and apparatus for forming strings of pocketed coil springs wherein a web of fabric is folded to define a tube having a first flap and a second flap folded underneath the first flap. The flaps are then separated at a coil insertion station without the need for one of the flaps to be deflected from the other flap to form an opening in the tube. After coil insertion, the second flap may be deflected to overlap the first flap or the opening may simply be closed with the second flap underlying the first flap. The flaps can thereafter be welded together to form a flat overlapping side seam. Thus, the first flap deflection station as disclosed in U.S. Pat. No. 5,613,287 is eliminated. The folding of the tube in the present invention is accomplished at the fabric in-feed station as is used in the apparatus disclosed in the St. Clair application.

BRIEF DESCRIPTION OF THE DRAWING

The foregoing and other novel features of the invention will become apparent upon a reading of the following detailed description taken in conjunction with the accompanying drawings wherein.

DETAILED DESCRIPTION

Figure 1:
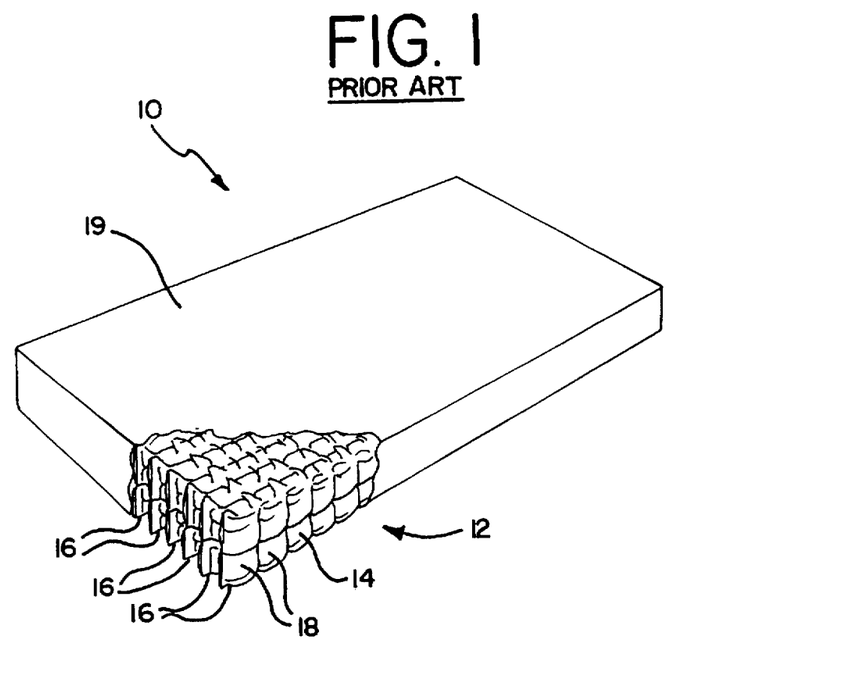
FIG. 1 is a perspective view of a prior art mattress partially broken away to show a conventional innerspring construction.

Referring now to the drawings, and initially to FIG. 1, a mattress assembly of a type well-known in the art is designated generally by reference numeral 10 and includes an innerspring core assembly 12 of the so-called Marshall construction. The core 12 includes a string 14 of coils 16 within fabric pockets 18 arranged in a closely packed array having a generally rectangular shape in plan. For purposes of the present disclosure, the term coils may be used interchangeably with springs or coil springs. The coils 16 are all oriented with their longitudinal axes parallel to each other and with their ends all lying in a common plane. A suitable cover 19 is provided for the innerspring core 12 and is typically made of a quilted foam and/or fabric material defining a sleeping surface.

Figure 2:
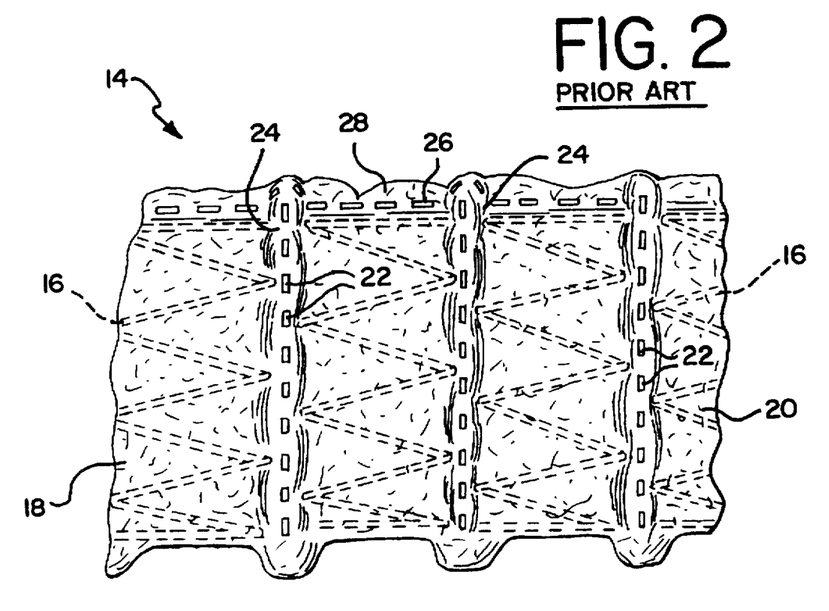
FIG. 2 is a fragmentary side view of the prior art innerspring shown in FIG. 1.

Referring now to FIG. 2, a portion of the prior art string 14 of coils 16 enclosed within fabric pockets 18 is illustrated in side view and comprises a web of fabric 20 which is essentially folded in half lengthwise. The fabric is preferably heat sensitive and is formed into a series of spaced pockets by transverse welds 22. The welds 22 define webs 24 connecting the pockets to form a string 14 which can be of any preselected length. Because the fabric 20 is folded in half, a seam 26 is welded across the upper edge of the string 14, as viewed in FIG. 2, in order to close the pocket. This forms a pair of flaps 28, only one of which can be seen, running lengthwise of the string 14 above the plane defined by the upper ends of the coils 16. The flaps 28 are necessary to space the welds of the seam 26 inwardly of the edges of the fabric 20 and thereby assure adequate strength of the seam 26, as well as to provide for proper alignment of the string 14 in manufacture.

Figure 3:
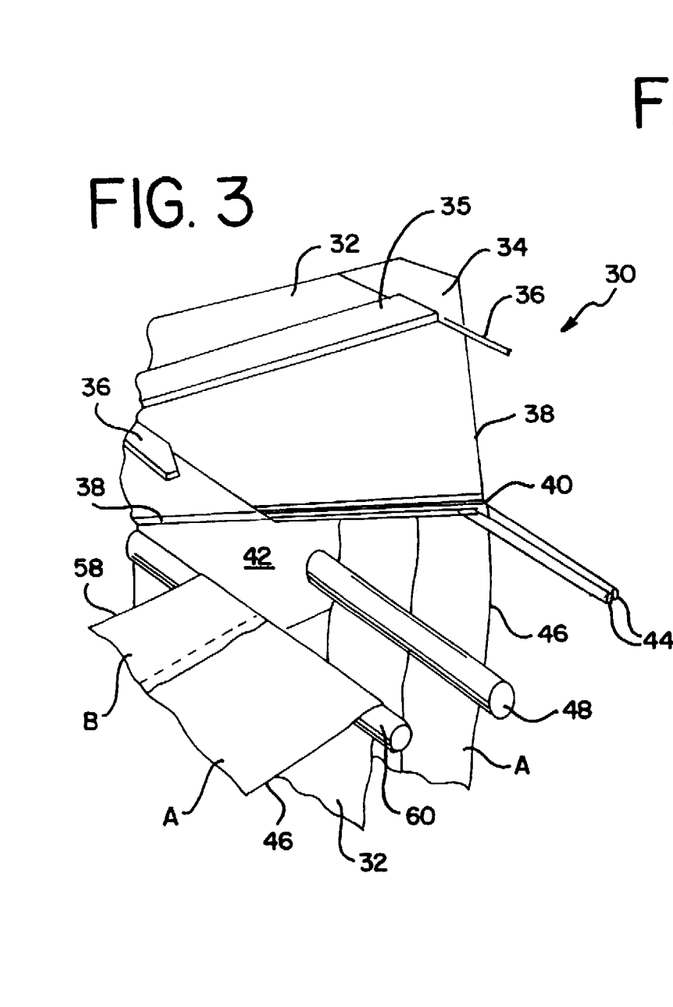
FIG. 3 is a partial perspective view of a fabric infeed station of an apparatus in accordance with the present invention.
Figure 4:
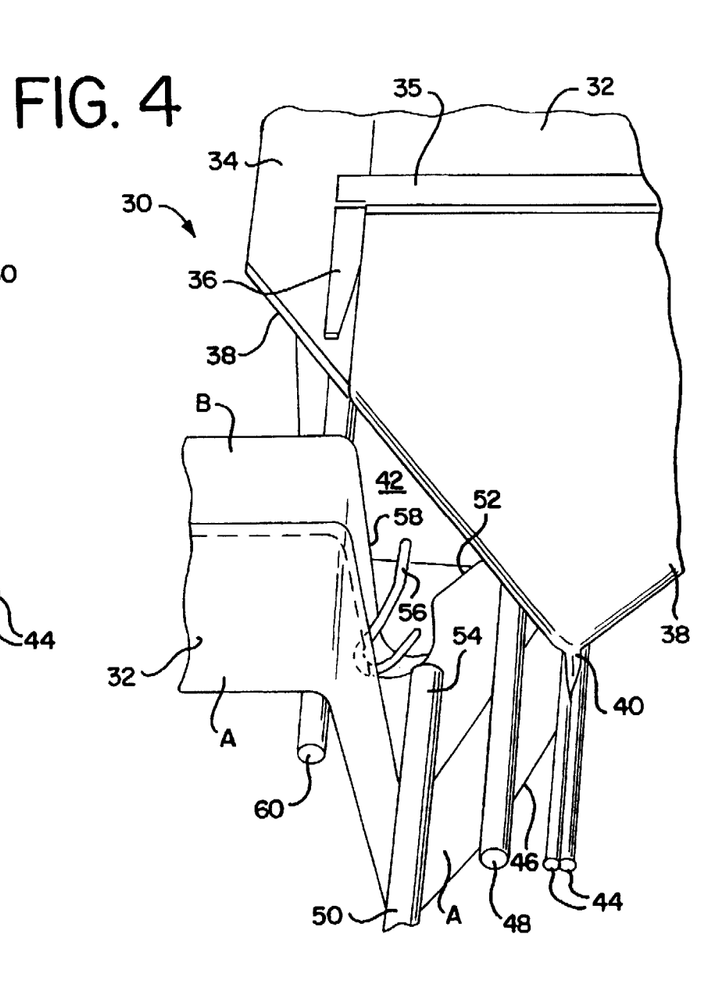
FIG. 4 is another partial perspective view of the infeed station of FIG. 3 showing fabric being folded therein according to the invention.

Turning now to FIGS. 3 and 4, a portion of an apparatus for constructing strings of pocketed coil springs 16 in accordance with the invention is designated generally by the reference numeral 30. As described hereinafter, the apparatus will be discussed in terms of its progressive sequences of operation, in the so-called apparatus direction, beginning with the portion 30 which is a pocket material in-feed station.

At the in-feed station 30, a web of heat sensitive fabric 32 is fed into the apparatus across a diamond-shaped folding plate 34. Preferably, the fabric 32 is of a non-woven polypropylene composition, for example, of a type sold under the trade name DUON. A guide bar 35 extends over the top of the fabric 32 in spaced relation to the folding plate 34 to assure that the fabric 32 will lay flat on the plate 34. Adjustable guide bars 36 are positioned along opposite edges of the fabric web 32 to properly align the fabric 32 for folding. The fabric 32 travels over edges 38 of the folding plate 34 which converge to a point 40. Beneath the plate 34 and extending from a frame member 42 are a pair of closely spaced parallel guide bars 44. The guide bars 44 are aligned with the point 40 of the folding plate 34 and may have a mounting structure which includes spring tensioning means (not shown) to urge them into closely spaced relation. The fabric 32 passes between the guide bars 44 and a first fold 46 in the fabric 32 is created defining a first flap which will be consistently designated hereinafter as flap A.

The web of fabric 32 next passes around an idler roller 48 which extends from and is journalled for rotation on the frame 42. As best seen in FIG. 4, the fabric 32 then passes around a second roller 50. This roller 50 is journalled on a frame member (not shown) which is disposed opposite to and spaced from frame 42. The roller 50 extends only a portion of the width of the folded fabric 32 creating a loose edge 52 of fabric 32 which passes around free end 54 of the second roller 50. A smoothly rounded hook member 56 extends from the frame 42 in proximity with the end 54 of the roller 50 and engages the loose edge 52 of fabric 32 causing the edge 52 to reversely turn over the web 32 and form a second fold 58. The second fold 58 creates a second flap which will be designated consistently hereinafter as flap B. In accordance with the invention, the hook member 56 engages the edge 52 of the fabric 32 such that flap B is tucked under flap A. The web 32 which has now been twice folded then passes over a third roller 60 which is journalled for rotation on the frame 42 and the web 32 exits the fabric in-feed station 30 in an essentially horizontal orientation.

Figure 5:
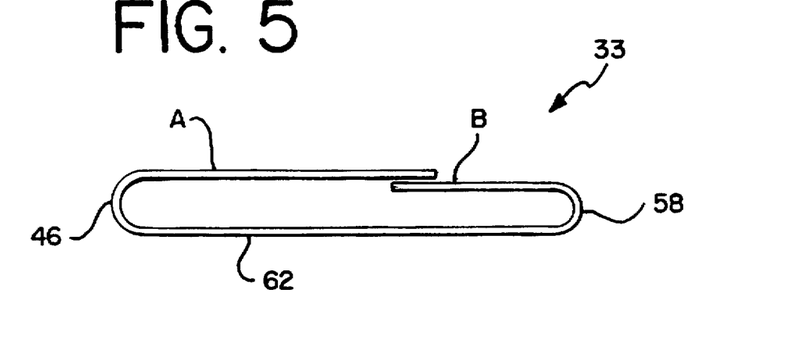
FIG. 5 is a schematic end view of a fabric tube constructed in accordance with the present invention.

The configuration of the fabric 32 in accordance with the invention after it leaves the in-feed station 30 is shown schematically in FIG. 5. The fabric 32 is formed into a fabric tube 33, preferably having an essentially flat tubular shape with flap A folded over a back portion 62 at first fold 46 and flap B folded over back portion 62 at second fold 58. In a preferred form, flap A is approximately six inches in width while flap B is approximately three inches in width. Also, flap A preferably overlaps flap B by approximately one-half inch. It can be appreciated that the width of flap A can be predetermined by the adjustable lateral alignment of the fabric web 32 with respect to the point 40 of the folding plate 34. Moreover, the width of flap B can be predetermined by the suitable positioning of the second roller 50 and associated hook member 56.

Figure 6:
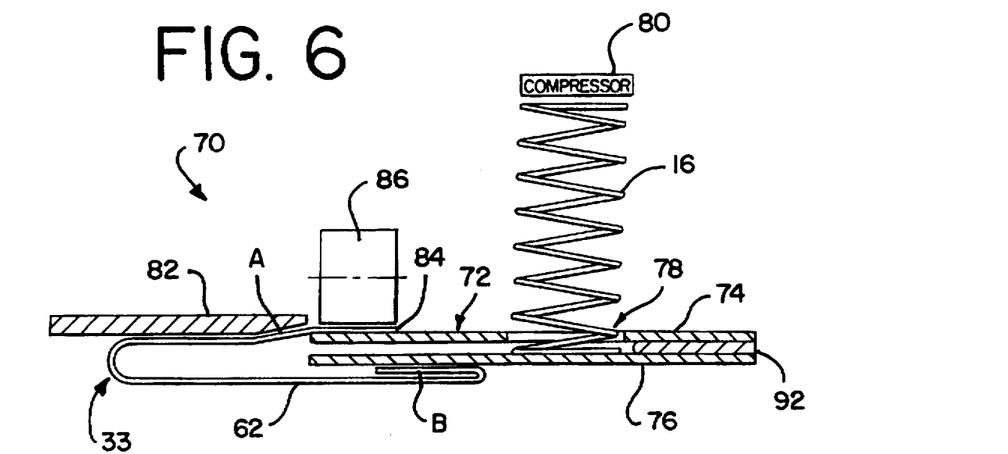
FIG. 6 is a schematic view of a spring insertion station in accordance with the present invention illustrating a stage in the inventive process wherein a spring, in an uncompressed state, is positioned prior to insertion into a fabric tube.

The fabric tube 33 as thus constructed advances to a coil insertion station shown in FIG. 6 and designated generally by the reference numeral 70. A coil inserter assembly is designated as 72 and includes an upper plate 74 and a lower plate 76 arranged parallel to one another and spaced from one another by approximately three-eighths of an inch. Upper plate 74 has a circular opening 78 which is dimensioned to permit a coil spring 16 to pass through it and be supported on the lower plate 76 with the longitudinal axis of the spring 16 oriented vertically. It is to be noted that the spring 16 is transported to the inserter 72 in a fully extended state by any suitable transport means (not shown) and is positioned under a compressor 80 which is in vertical alignment with the opening 78 in the upper plate 74. The condition of the fabric tube 33 at this point is such that flap B is positioned to pass underneath the lower plate 76 of the inserter 72 while flap A passes under a support plate 82 and has edge portion 84 supported on the upper plate 74 of the inserter 72 whereby flap A is separated from underlying flap B and an opening is formed between the flaps as best illustrated in FIG. 6. The edge portion 84 of flap A is pressed firmly to the plate 74 by a tensioned roller 86.

Figure 7:
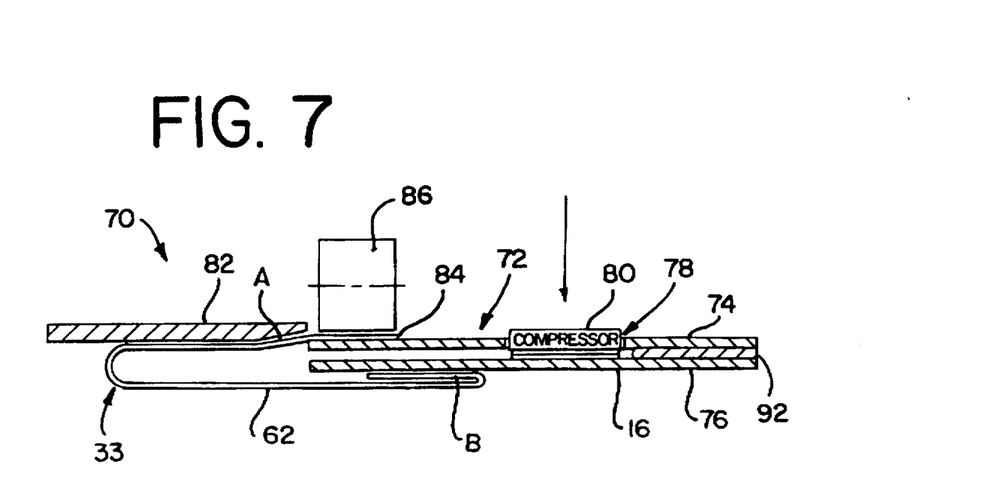
FIG. 7 is a schematic view of the spring insertion station of FIG. 6 showing the spring in a fully compressed state for insertion into a fabric flap.
Figure 8:
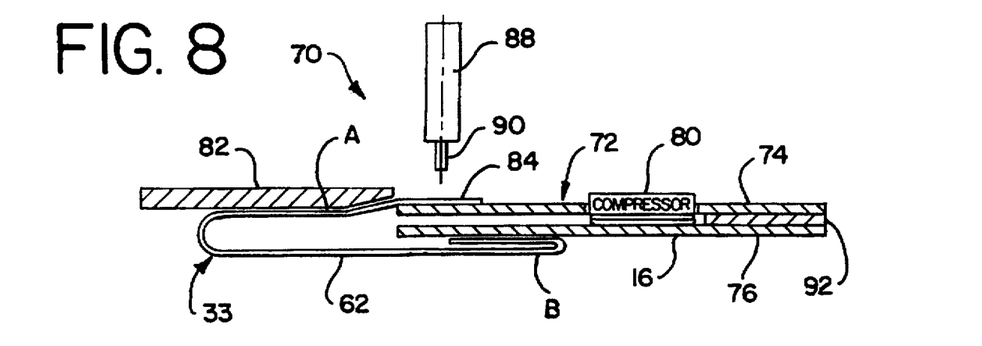
FIG. 8 is a further schematic view of the spring insertion station of FIG. 6 with the apparatus aligned for insertion of the fully compressed spring into the fabric tube.
Figure 9:
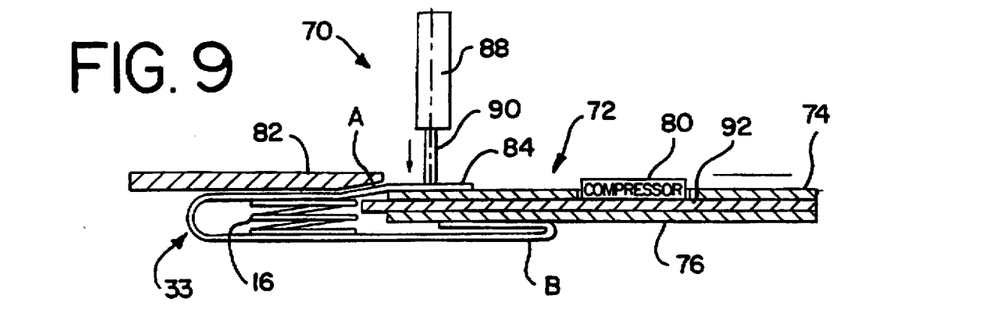
FIG. 9 is a schematic view of the spring insertion station of FIG. 7 showing the spring inserted into the fabric tube.

In FIG. 7, the spring 16 is shown in a compressed state upon activation of the compressor 80. FIG. 8 shows the next step of the coil insertion process wherein the fabric tube 33 is advanced in a manner such that edge portion 84 of flap A moves into registry with an air cylinder 88. Coil insertion is completed in the schematic view of FIG. 9 which shows ram 90 of the air cylinder 88 activated to hold the edge portion 84 of flap A firmly to the upper inserter plate 74 while a reciprocating air operated inserter bar 92 moves the compressed coil 16 horizontally from the compressor 80 through the opening formed between flap A and flap B to a position in the fabric tube 33 beneath flap A as best illustrated in FIG. 9.

Figure 10:
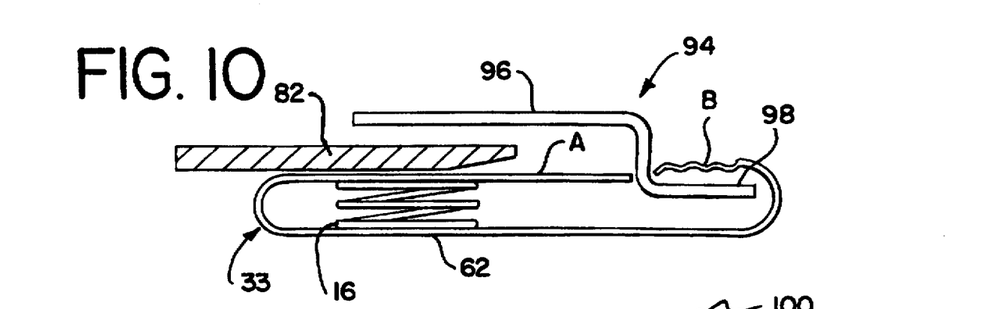
FIG. 10 is a schematic view of a deflector station of an apparatus in accordance with a first form of the present invention illustrating a stage in the process wherein the flaps of the fabric tube are realigned after spring insertion.

Once coil insertion is completed, the fabric tube 33 in accordance with the first form of the invention advances with the compressed coil 16 under support plate 82 to a deflector station designated generally as 94 in FIG. 10. At this station 94, a deflector arm 96 has a free end portion 98 which engages and lifts flap B to a realigned overlapped condition with respect to flap A.

Figure 11:
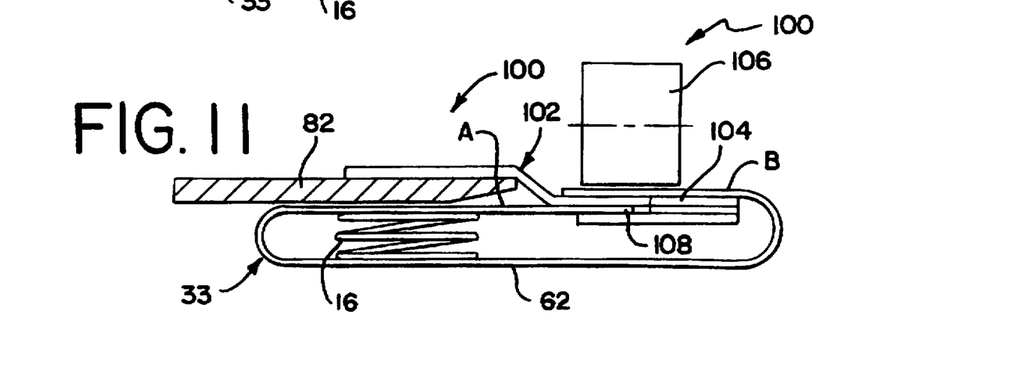
FIG. 11 is a schematic view illustrating apparatus for performing the next processing stage in accordance with the present invention wherein the flaps on the fabric tube are positioned for processing after insertion of a spring therein.

FIG. 11 illustrates apparatus 100 for performing the next step in the process of the first form of this invention wherein the fabric tube 33 is received by an anvil 102. The anvil 102 may be supported by plate 82 and includes a first upper arm 104 over which flap B passes. Flap B is pressed firmly into contact with arm 104 by a second tensioned roller 106. In this step of the process, flap A passes under the first anvil arm 104 and over the top of a second lower arm 108 which is suspended in a cantilevered manner from first arm 104. The anvil 102 is designed so that lower arm 108 also projects horizontally in the apparatus direction from beneath upper arm 104.

Figure 12:
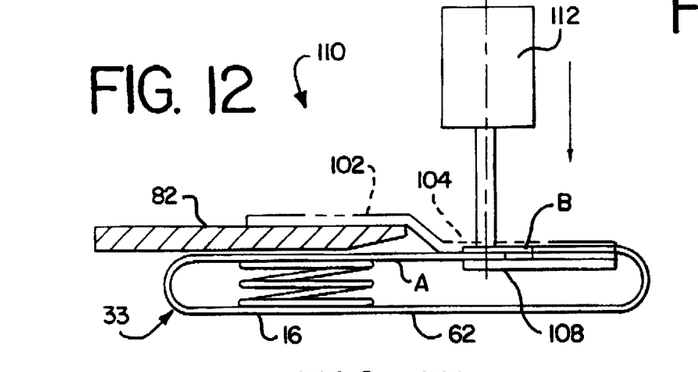
FIG. 12 is a schematic view of a first welding station of an apparatus in accordance with the present invention illustrating a stage in the inventive process wherein the flaps on the fabric tube are lap sealed.

Turning now to FIG. 12, a first welding station is designated generally by the reference numeral 110 and includes an ultrasonic welding horn 112. At this station 110, the fabric tube 33 has passed the upper arm 104 of the anvil 102 whereupon flap B returns to overlapped engagement with flap A, the two flaps being supported by lower arm 108 of the anvil 102. The welding horn 112 is next activated to place one or more spot welds on the lap between flap A and flap B, whereby a lap seal is formed.

Figure 13:
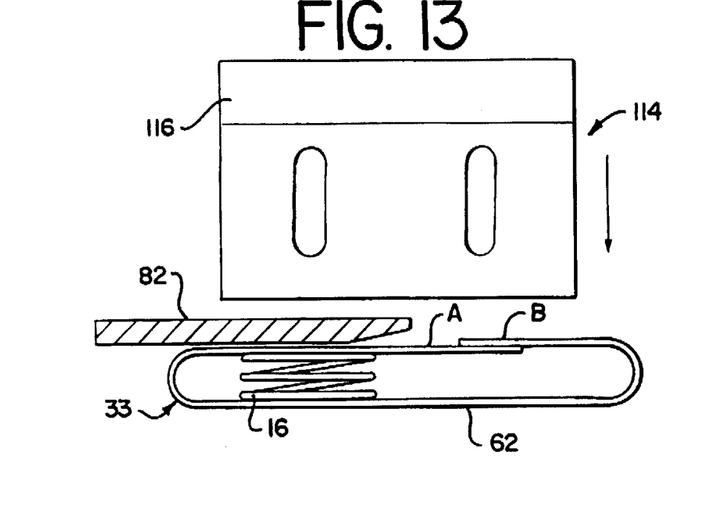
FIG. 13 is a schematic view of a second welding station of an apparatus in accordance with the present invention illustrating a stage in the inventive process wherein discrete fabric pockets are formed with coil springs encapsulated therein.

In FIG. 13, a second welding station is designated by the reference numeral 114 and includes a second welding horn 116 which is oriented transversely to the fabric tube 33. In a manner well-known in the art, this second welding horn 116 is designed to form a linear series of spaced welds between the upper and lower sides of the fabric tube 33 intermediate successive coils 16 thereby forming a string 14 of discrete fabric pockets 18 with individual spring coils 16 encapsulated within each pocket.

Figure 14:
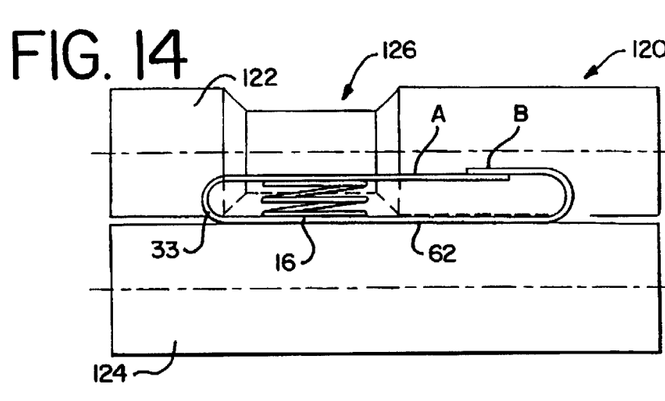
FIG. 14 is a schematic view of a drive station of an apparatus in accordance with the present invention illustrating a mechanism for drawing the fabric tube through the apparatus for processing.

FIG. 14 illustrates schematically a drive station 120 of the apparatus which comprises a pair of parallel closely spaced rollers 122 and 124. The rollers 122 and 124 are so tensioned together that they serve to draw the fabric tube 33 through the apparatus from the in-feed station 30 through all subsequent processing stations of the apparatus. A suitable recess 126 is formed in one of the rollers 122 or 124 so that the coil springs 16 can pass freely between the rollers 122 and 124.

Figure 15:
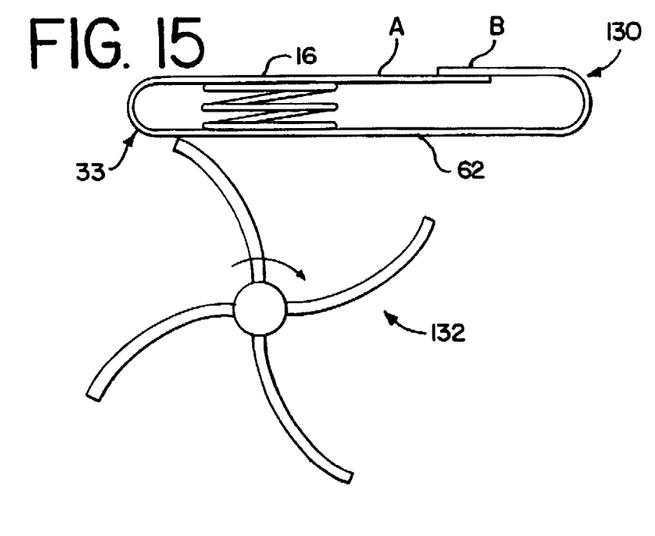
FIG. 15 is a schematic view of a final forming station of an apparatus in accordance with the present invention illustrating a mechanism for properly orienting the spring within a fabric pocket.

A final forming station in accordance with the first form of the invention is shown schematically in FIG. 15 and designated generally by the reference numeral 130. At this station 130 a rotating beater assembly 132 is provided with resilient arms 134 for striking the fabric tube 33 in the area of the pocketed coil springs 16. This striking action of the beater 132 causes the coil springs 16 to rotate ninety degrees within their pockets and to expand from their compressed state to an extended state, thereby filling the pocket 18.

Figure 16:
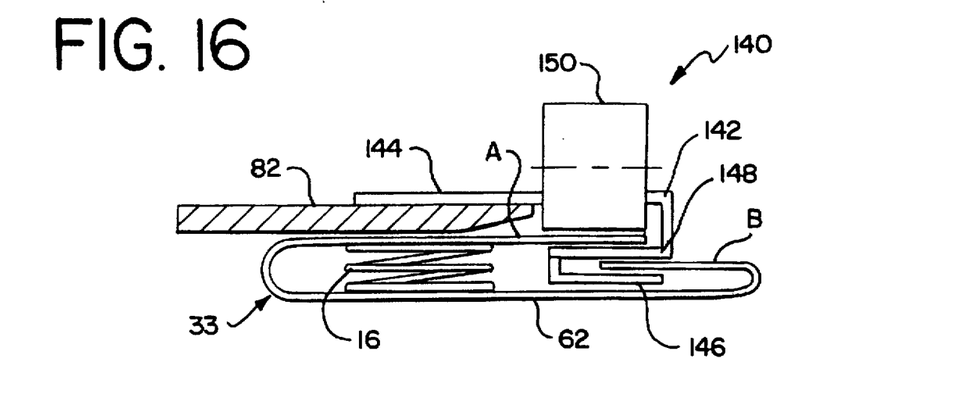
FIG. 16 is a schematic view illustrating apparatus for performing a processing stage in accordance with a second form of the present invention wherein the flaps of the fabric tube are not re-oriented as in FIGS. 10–15.
Figure 17:
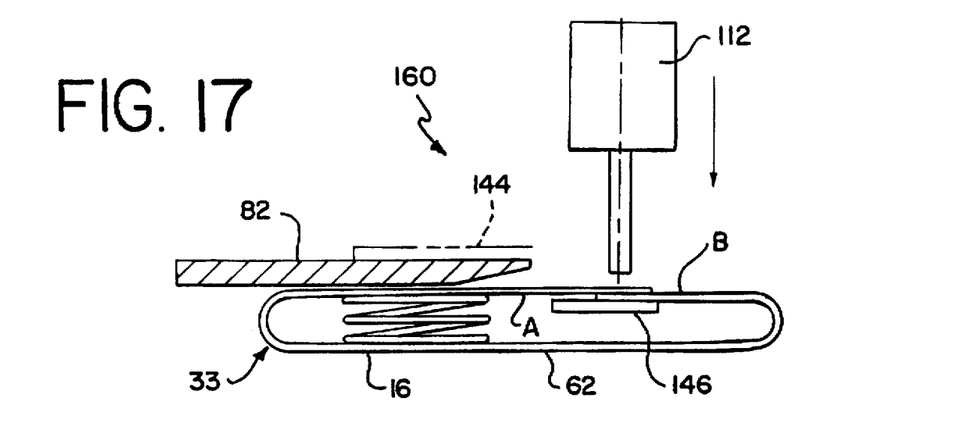
FIG. 17 is a schematic view of a first welding station of an apparatus in accordance with the second form of the present invention wherein the flaps on the fabric tube are sealed.
Figure 18:
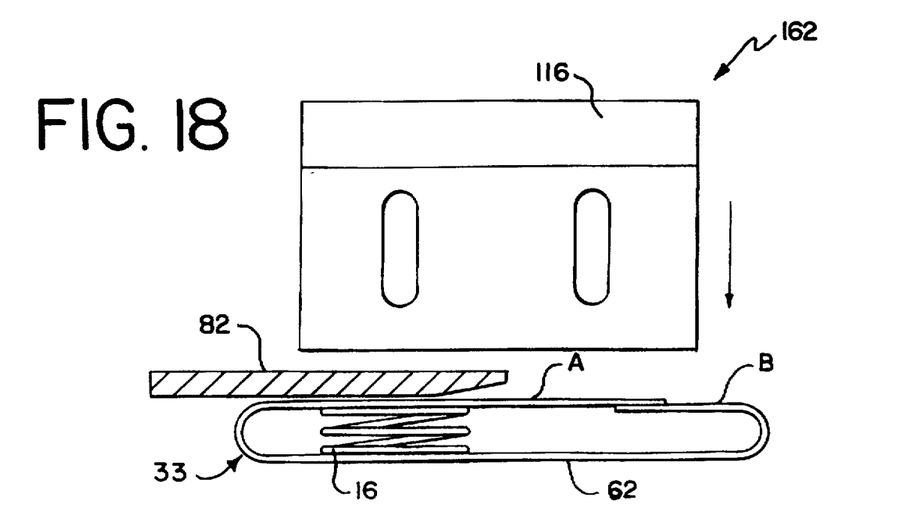
FIG. 18 is a schematic view of a second welding station of an apparatus in accordance with the second form of the present invention illustrating a stage in the inventive process wherein discrete fabric pockets are formed with coil springs encapsulated therein.
Figure 19:
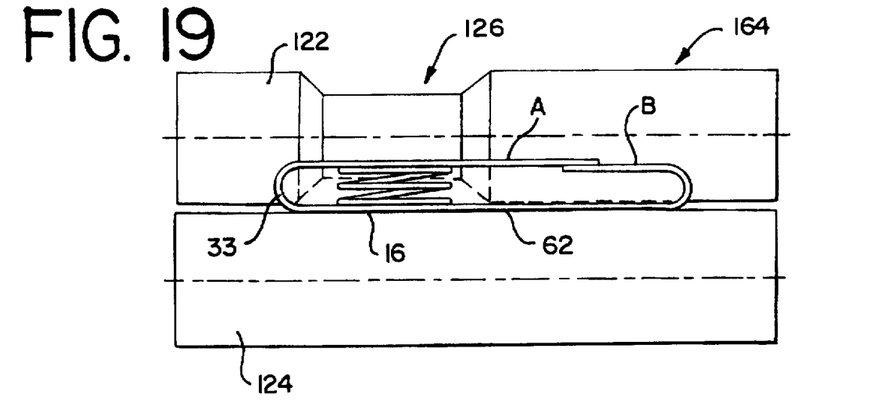
FIG. 19 is a schematic view of a drive station of an apparatus in accordance with the second form of the invention illustrating a mechanism for drawing the fabric tube through the apparatus for processing.
Figure 20:
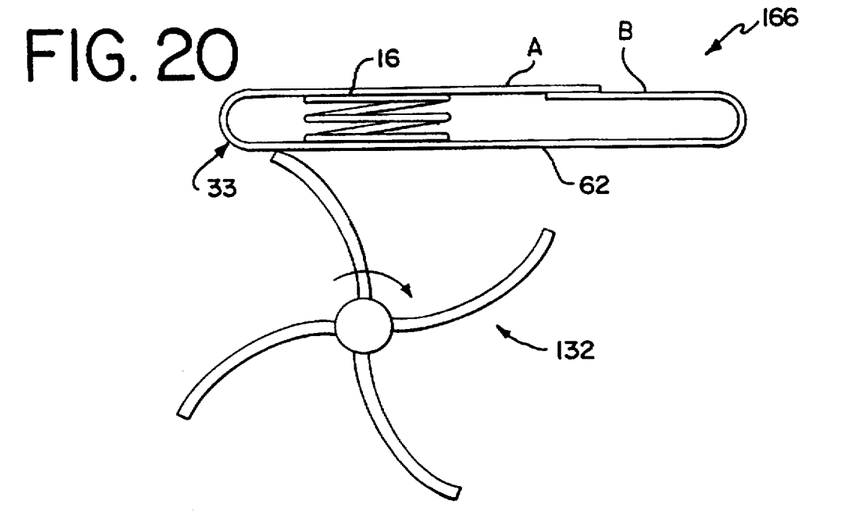
FIG. 20 is a schematic view of a final forming station of an apparatus in accordance with the second form of the present invention illustrating a mechanism for properly orienting the spring within the fabric pocket.

In a second form of the invention, a fabric tube 33 as in the first form of the invention, FIG. 5, may be initially formed as illustrated in FIG. 4 wherein hook 56 guides loose edge 52 of the fabric 32 to form a flap B which is underlapping flap A. Moreover, this tube 33 may be advanced through the same coil insertion processes illustrated in FIGS. 6–9. However, after coil insertion, the tube 33 is advanced directly to station 140, as illustrated in FIG. 16, wherein the tube 33 is received by a modified anvil 142 without any deflection of flap B. This anvil 142 has a generally S-shaped configuration with a leg portion 144 extending over and supported on plate 82 such that the anvil 142 is cantilevered from plate 82. The S-shaped configuration provides an arm portion 146 for supporting flap B of the tube 33a and an arm portion 148 for supporting flap A of the tube 33a. Flap A is firmly pressed into contact with arm portion 148 by a tensioned roller 150. In the next station 160, as illustrated in FIG. 17, the arm portion 146 of the anvil 142 rejoins the flaps A and B in overlapping relation and supports the overlap for welding by welding horn 112. As in the first forms of the invention, the tube 33 next advances to a second welding station 162, as shown in FIG. 18, wherein transverse welds are formed across the tube 33 to create fabric pockets. The tube 33 next moves through drive station 164 (FIG. 19) and finally to beater station 166 (FIG. 20). It can be appreciated particularly from FIG. 20 that the tube 33 in this second form of the invention will be finally assembled with flap B underlapping flap A and, therefore, flap B could be snagged by the spring 16 as the beater 132 strikes the tube 33 to rotate the spring 16 within its respective pocket. While snagging may be a problem were the beater to rotate counterclockwise as viewed in FIG. 20, in practice, by rotating the beater clockwise, the bottom of the spring 16 will move along the lower surface 62 of the tube 33 as the spring 16 is re-oriented. Thereby, the spring 16 remains clear of leading edge 168 of the flap B and snagging of the flap B does not occur.

It can now be appreciated that the apparatus of the present invention is highly efficient and effective for constructing strings of pocketed coil springs which have a seal formed along a side thereof instead of having a seal adjacent to the ends of the springs. A string of fabric pocketed coils 170 constructed with the present apparatus is illustrated in side view in FIG. 21. As seen therein, a flat overlap side seam 172 eliminates the two upper flaps 28 of the prior art string 14 shown in FIG. 2. Thus, the coil string 170 is highly desirable for use in a mattress innerspring assembly in that it eliminates objectionable false loft. It can also be appreciated that because the side seam 172 may overlap by only about one-half inch or so, savings in fabric 32 can be achieved over the prior art constructions which have two excess flaps 28. Further, the apparatus of the present invention may be readily configured from existing known equipment with the addition and/or replacement of a few parts and subassemblies. Accordingly, the invention lends itself to highly economical retrofitting of equipment currently in use.

Figure 21:
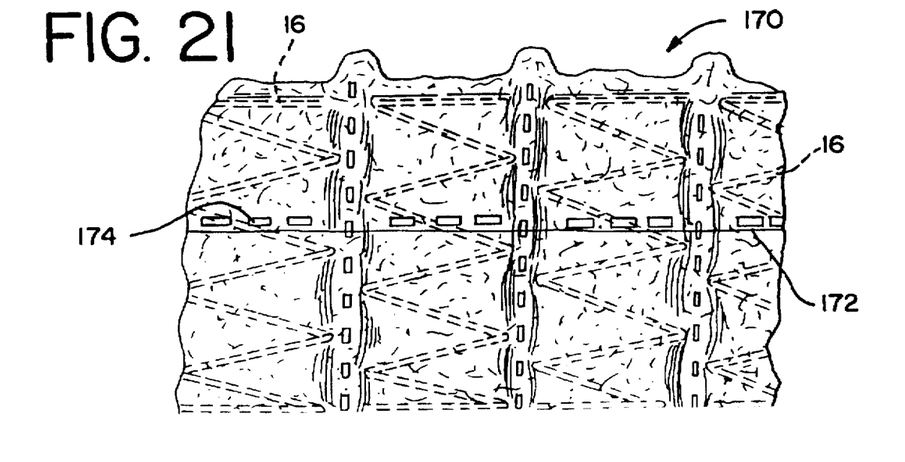
FIG. 21 is a fragmentary side view of a string of pocketed coils constructed in accordance with the principles of the present invention.

Although the string 170 is shown with welds 174 disposed along the upper side of the seam 172 in FIG. 29, it can be appreciated that if this string 170 were constructed according to the above-described first form of the invention, the corresponding string 170 constructed according to the second form of the invention will simply differ only in that the welds 174 will be on the opposite side of the seam 172 as the string 170 leaves the apparatus. Further, it can be appreciated that while discrete spot welds 174 have been illustrated as formed in the fabric 32 along the seam 172, linear welds may readily be used along the seam 172 if more positive closing of the seam 172 is deemed desirable.

While the present invention has been described in connection with preferred embodiments thereof, it will be understood by those skilled in the art that many changes and modifications may be made without departing from the true spirit and scope of the invention. Accordingly, it is intended by the appended claims to cover all such changes and modifications which come within the true spirit and scope of the invention.

What is claimed is:

1. Apparatus for constructing strings of coil springs wherein each of the coil springs is enclosed within individual fabric pockets having flat overlapping side seams comprising:

a fabric in-feed mechanism having means for folding a flat web of fabric a first time to define a first flap and means for folding said web a second time to define a second flap underlying said first flap thereby defining a fabric tube having a flap side and a back side;

means for separating said first flap from said underlying second flap to form an opening between said flaps;

a coil spring inserter structured and dimensioned to insert a compressed coil spring through said opening into said fabric tube;

means for closing said opening with said second flap underlying said first flap on said fabric tube and with said compressed coil spring enclosed within said tube; and means for interconnecting said closed first and second flaps.

2. The apparatus of claim 1 wherein said closing means includes a deflector arm for engaging said underlying second flap and redeflecting it into overlapping relationship with said first flap.

3. The apparatus of claim 1 wherein said fabric infeed mechanism includes a diamond-shaped plate for creating a first fold in said fabric web.

4. The apparatus of claim 3 wherein said fabric infeed mechanism includes a hook member structured and dimensioned to create a second fold in said fabric web.

5. The apparatus of claim 4 wherein said first fold creates a first flap, said second fold creates a second flap and said hook member is configured to lap said second flap underneath said first flap.

6. The apparatus of claim 4 wherein said hook member reversely turns an edge of said web to create said second fold.

7. The apparatus of claim 1 including means for forming transverse seams between the pocketed coil springs creating discrete, individual pockets to accommodate said coils.

8. The apparatus of claim 7 wherein said means for forming transverse seams between the pocketed coil springs comprises a welding device.

9. The apparatus of claim 1 including a beater assembly for striking the pocketed compressed coils to rotate them in the fabric pockets and to cause the coils to expand longitudinally from said compressed state.

10. The apparatus of claim 1 wherein said coil spring is compressed along an axis oriented at right angles to the longitudinal axis of said fabric tube, and said coil spring is inserted transversely to the longitudinal axis of said fabric tube.

11. The apparatus of claim 1 wherein said coil spring inserter includes a pair of parallel spaced plates.

12. The apparatus of claim 11 wherein a first one of said plates includes an opening which is structured and dimensioned to enable said spring to be compressed through said opening in said plate.

13. The apparatus of claim 11 including a reciprocating bar disposed between said plates for pushing said compressed coil out of said coil spring inserter and into said fabric tube.

14. The apparatus of claim 1 wherein said means for interconnecting said first and second flaps comprises a welding device.

15. The apparatus of claim 14 wherein said welding device is an ultrasonic welder.

16. The apparatus of claim 15 wherein said fabric is heat sensitive.

17. A method of forming a string of coil springs wherein each of the coil springs is enclosed within an individual fabric pocket having flat overlapping side seams, the method comprising the steps of:

folding an elongated web of fabric a first time to create a longitudinally extending first flap;

folding said web of fabric a second time to create a second longitudinally extending flap which underlies said first flap laterally, thereby defining a fabric tube having a flap side and a back side with said first flap on said flap side laterally overlapping said second flap on said flap side;

conveying said fabric tube longitudinally across a spring inserter in a manner such that said spring inserter separates said overlapping flaps thereby forming a laterally extending opening in said tube;

inserting a compressed coil spring into the opening in said tube;

conveying said fabric tube to an anvil and thereby closing the opening in said tube with said first flap laterally overlapping said second flap; and interconnecting said laterally overlapping first and second flaps to form a lap seal therebetween.

18. The method of claim 17 including the step of forming transverse seams between the coil springs creating discrete, individual pockets to accommodate said springs.

19. The method of claim 17 wherein said first flap is created by passing said web of fabric over edges of a diamond-shaped folding plate.

20. The method of claim 17 wherein said second flap is created by reversely turning an edge of said web around a hook member.

21. The method of claim 17 wherein said coil spring is compressed along an axis oriented at right angles to the longitudinal axis of said fabric tube, and said coil spring is inserted transversely to the longitudinal axis of said fabric tube.

22. The method of claim 17 including the further step of rotating said compressed coil spring within said pocket to allow said coil spring to expand within said pocket.

23. The method of claim 17 wherein said closing step includes redeflecting said second flap from below said first flap to reoverlapping relation with said first flap.

* * * * *